Jan. 17, 1939. E. T. CONDON 2,144,595
AUTOMATIC RESET MEANS FOR AUTOMOBILE DIRECTIONAL SIGNAL SWITCHES
Filed Feb. 8, 1935 2 Sheets-Sheet 1
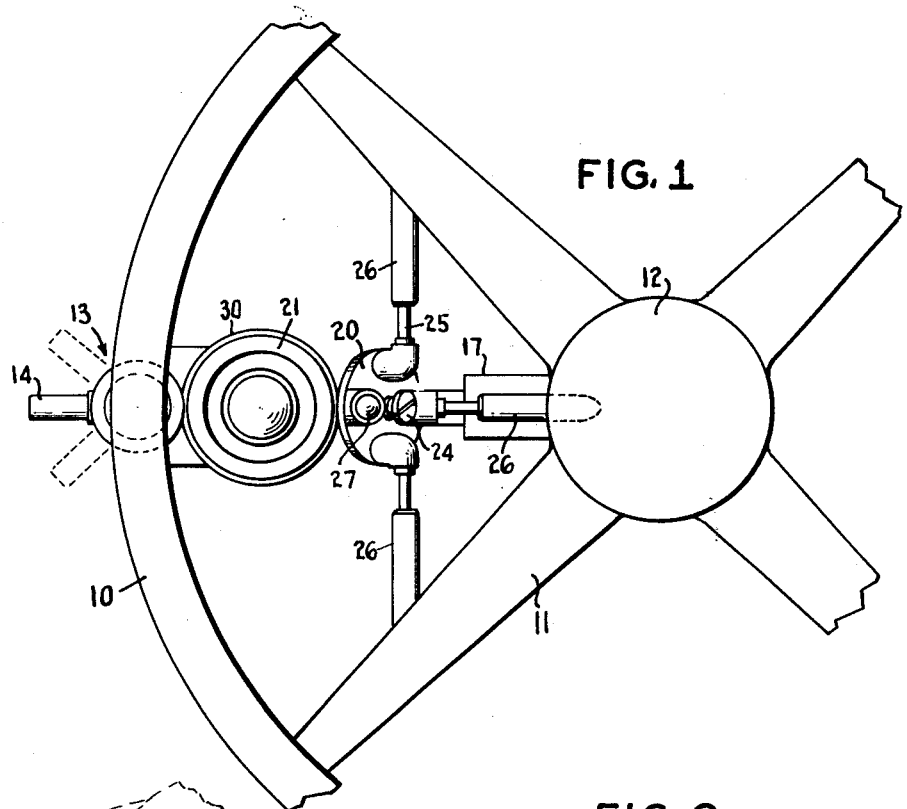
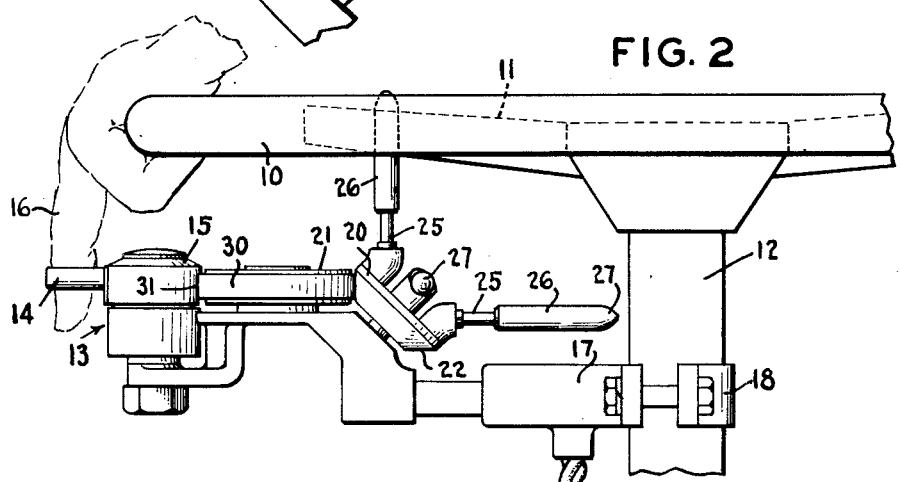
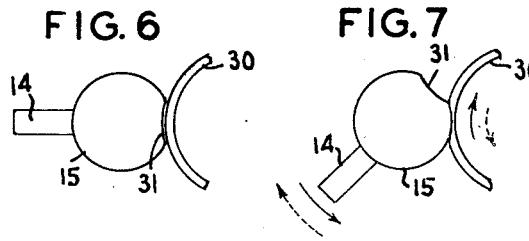
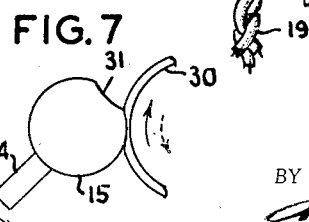
INVENTOR.
EDWARD T. CONDON
BY
ATTORNEY.

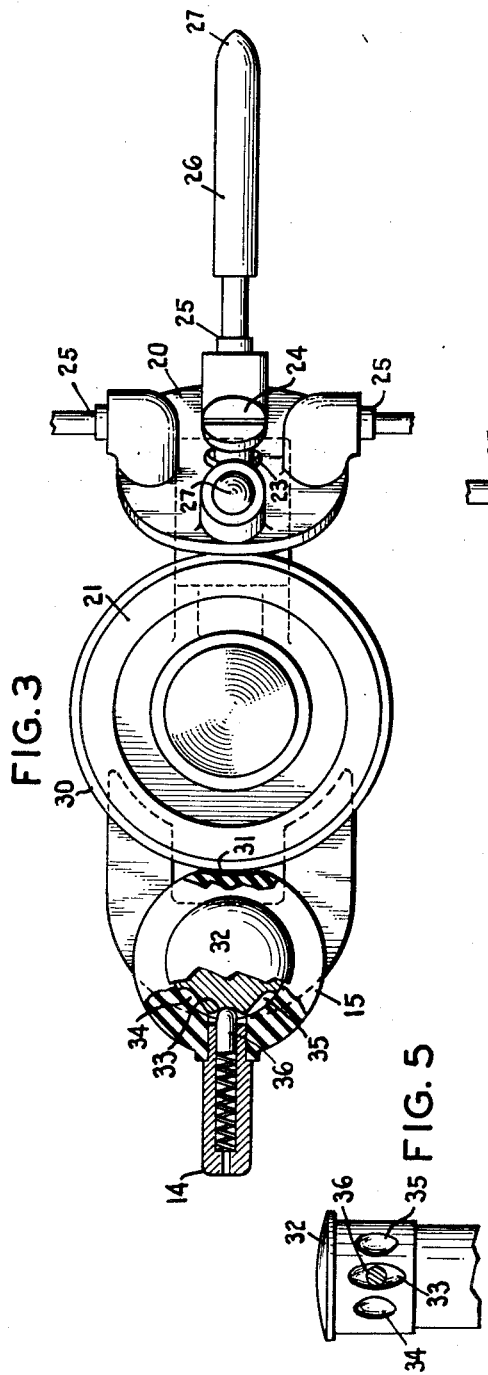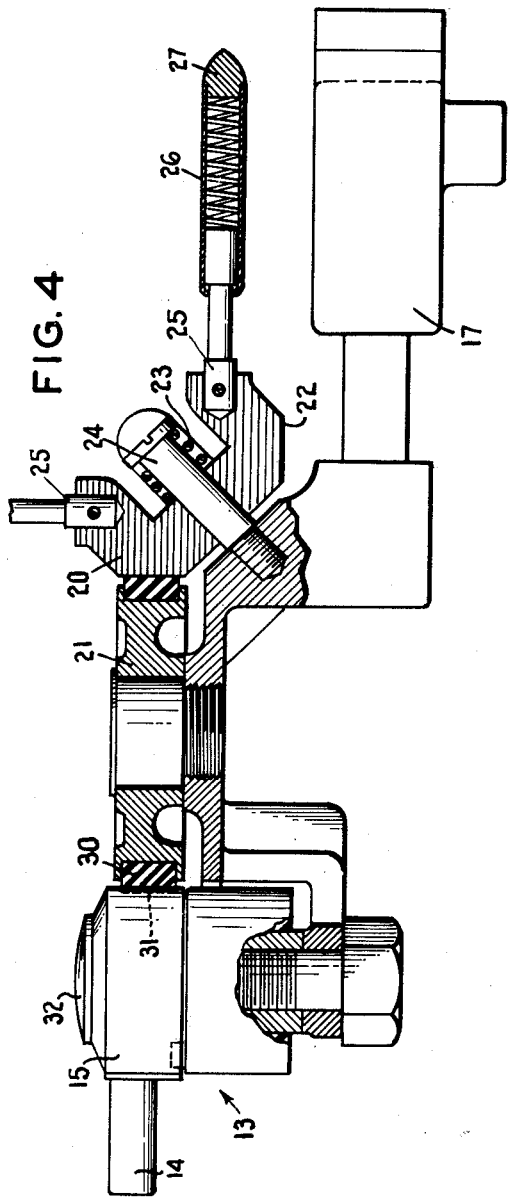

Patented Jan. 17, 1939

2,144,595

UNITED STATES PATENT OFFICE 2,144,595

AUTOMATIC RESET MEANS FOR AUTOMOBILE DIRECTIONAL SIGNAL SWITCHES

Edward T. Condon, New York, N. Y.

Application February 8, 1935, Serial No. 5,545

6 Claims. (Cl. 200—59)

The invention relates to manually controlled switches as utilized in the operation of automobiles to affect directional signals, for example, when it is desired to make a turn either to the right or to the left; and it relates more especially to reset mechanism for use in connection therewith.

The invention has for an object the provision of reset mechanism, operative through the action of the steering wheel of an automobile as through return movement thereof, for automatically restoring the switch handle or actuating member of a switch device after a turn has been completed by an automobile.

A further object of the invention resides in the provision of a combined reset and switch unit which may conveniently be associated with the steering wheel of an automobile, for example, by attachment to the steering post thereof, the arrangement being such that the manipulating element for the switch will be conveniently accessible for manual operation by an operator's finger and without requiring his hand to leave said steering wheel, no difficulty, moreover, being encountered in locating said element.

A still further object of the invention resides in the provision of a simple, inexpensively constructed and effective unit for this purpose.

The invention has for another object the provision of means in connection with the switch whereby its manipulating element will be guided and more positively located into predetermined positions, namely a neutral or inoperative position and one or more operative positions displaced therefrom, as upon opposite sides thereof.

In carrying out the invention, a suitable switch mechanism providing for a plurality of operating positions and having a manipulating element, is located immediately beneath the rim of the steering wheel so that the finger of an operator's hand resting upon said wheel may readily move the manipulating element to one side or the other of its normal neutral position and in conformity with the desired signal to be given through closing of a switch contact. The said element, furthermore, is arranged to have associated therewith a driven member adapted for frictional engagement with an oscillatable sleeve or like element connected with the said manipulating element. This driven member, in turn, is arranged to be actuated through an intermediate driving member embodying a turnstile mechanism, including axially yieldable fingers designed to be engaged as by the spokes of the steering wheel.

Provision is made, furthermore, for the driven member to be substantially without effect upon the sleeve element of the switch when the latter is set in its neutral and inoperative position; but when angularly displaced, frictional contact is established with the driven member, which includes for this purpose a resilient contacting portion. The movement of the driven member is so designed that, in effecting a turn with the steering wheel, the transmitted rotational movement of said driven element is in a direction tending to maintain the contact selected, while upon restoring the steering wheel, as for straightaway driving, the rotational movement of said driven member will be in a direction to restore the switch sleeve element and reset the same to the neutral position.

Moreover, to assist the switch element in assuming the neutral or selected locations and to maintain it in the neutral position against displacement due to vibration and like causes, the manually operable element thereof is constituted in the nature of a spring-urged plunger carried by the sleeve element and adapted to be guided into seats or sockets provided for the inner end of the same and formed in a stationary or body portion of the switch element.

The nature of the invention, however, will best be understood when described in connection with the accompanying drawings, in which:

Fig. 1 is a fragmentary plan view of a steering wheel and post of an automobile, and illustrates the novel combined switch and reset unit associated therewith.

Fig. 2 is a fragmentary side elevation thereof, and illustrates also the manner of manipulating the switch element of the unit.

Fig. 3 is a plan view, partly in section and on an enlarged scale, of the novel combined switch and rest unit.

Fig. 4 is a side elevation thereof, partly in vertical section.

Fig. 5 is a fragmentary elevation of the body portion of the switch element, with the manipulating element thereof in transverse section, and illustrates the locating sockets for said element.

Figs. 6 and 7 are diagrammatic views illustrating the reset operation of the unit.

Referring to the drawings, 10 designates the rim of the usual type steering wheel having a plurality of spokes 11 and carried by the post 12 in well-known manner for effecting the steering of an automobile through angular movement of the wheel in accordance with the desired direction of travel.

It is desirable, and in many States compulsory, to indicate to other vehicles upon the road an operator's intention to change the direction of travel; and to this end, various signal devices (not shown) are associated with an automobile to be actuated from a switch member under the manual control of the operator of said automobile. These switch means generally provide for three different positions of its manipulating element, namely a neutral position thereof and dead condition of the signals, and two operative positions, usually located upon opposite sides of the neutral position for indicating through the signals a right or left turn respectively.

In the present instance, such type of switch is suitable; and a switch 13 is indicated which, in accordance with the invention, is to be associated with said steering wheel as hereinafter more particularly set forth. This switch may be of any well-known or special design, for example, of the nature set forth in my copending application for U. S. Letters Patent filed March 24, 1931, Serial No. 524,990, and which embodies a manipulating element or handle member 14 oscillating the sleeve element 15 and controlling thereby contacts (not shown) in manner well understood.

The said manipulating element 14 is to be associated with the rim 10 of the steering wheel, as in extending horizontally immediately beneath said rim, that the finger 16 of an operator may engage said element without requiring that the hand be removed from the rim. The switch is conveniently positioned in this respect, as at the outer end of a bracket 17 having a clamp 18 bolting the same to the steering post 12 and through which bracket, also, the conductors 19 may be led to the switch contacts.

In addition, the bracket is caused to support the reset mechanism for the switch and affording thereby a unit for attachment to post 12. This mechanism comprises, generally, a driving member 20 and a member 21 driven thereby, which latter is adapted to engage the oscillatable sleeve 15 of the switch. The driving member constitutes a turnstile element having the bevelled friction surface 22, and is mounted for axial movement on the bracket 17 at an inclination of substantially 45° to the horizontal. The mounting is preferably so effected as to be more or less yielding, for example, in the provision of a coil spring 23 which is mounted about the stud 24 passing through the driving member and mounting it on the said bracket. This spring in bearing upon the top of the driving member exerts sufficient force thereon to insure the friction drive of the driven member 21 and to compensate for wear.

From the upper portion of the driving member 20 project outwardly a plurality of fingers 25 which are shown as equidistantly spaced thereon at an angle of 45° to the axis of rotation of the driving wheel and arranged to afford a turnstile therewith, the positioning of the fingers being such that one finger will at all times project vertically upwardly into the space between two adjacent spokes 11 of the steering wheel, being then adapted for engagement therewith. The outer end of each of these fingers, furthermore, is preferably made to yield axially as in the provision of a slidable tube 26 over the stem thereof and spring-urged outwardly. The outer end of the tube, moreover, is capped with a rounded or conically shaped head 27 so as to pass a finger freely under and allow it to slip by a spoke upon completion of the desired angular movement, and prevent jamming of the mechanism. By this expedient, as the steering wheel is turned, one arm after another will be engaged and the driving member 20 correspondingly rotated.

This rotation is designed to be transmitted to the driven member 21 which is provided with a circumferential liner or circular band of resilient friction material 30, such a rubber, and contacting with bevelled surface 22 of the driving member upon one side of its axis of rotation. Upon the other side of the said axis, the friction band 30 cooperates with sleeve 15 of the switch, contacting the periphery thereof. In the neutral position of the switch, band 30 rides freely through an arcuate recess or depression 31 provided in said periphery, and thereby no rotation of the driven member 21 is communicated to the said sleeve, the relative position of the different members being as indicated in Fig. 6. This permits the steering wheel to be operated freely without effect upon the switch, and notwithstanding the rotational movement imparted thereby to driving member 20. However, when the switch is manipulated to a contacting position, for example, in turning it in the direction indicated by the full-line arrow, Fig. 7 of the drawings, the sleeve periphery of greater radius contacts band 30, pressing into the same which yields due to its resiliency but exerts at the same time a considerable contacting pressure or friction thereon. The cushioning effect, nevertheless, is such that only a slight force is required to manually position the switch, as through contact of the operator's finger with the handle 14 thereof.

The contact set by the particular position of the switch aforesaid is so coordinated with the action of the steering wheel that the rotational movement imparted thereby in making the turn signalled through the switch will be such as to cause rotation of the driven member and band in the clockwise direction indicated by the full-line arrow, Fig. 7. This not only permits the driven member to slip past the sleeve but tends to maintain the contacting position of the switch, as indicated by the full-line arrow. There is obviated thereby also the possibility of not completing the contact manually.

When the turn has been completed and the steering wheel is rotated in the opposite direction for straightening out the travel of the car, rotation of the driven member and its band 30 will be in a counterclockwise direction, indicated by the arrow shown in dotted lines, Fig. 7, and will cause the sleeve element 15 to be rotated along in the direction likewise indicated by the arrow shown in dotted lines. This will serve to restore the switch to its normal or neutral position, the rotation of the sleeve being interrupted when contact of the band 30 is no longer had with said sleeve which has advanced to the position to bring its recess 31 normal to the said band.

In order to assist in this repositioning as well as to assist in maintaining the same or a selected contact position, the body and stationary portion 32 of the switch, Fig. 5, may be provided with a suitable depression or socket 33, for the neutral position, and with sockets 34 and 35 upon opposite sides thereof for the different contact positions. The walls of these sockets are designed such that from the approach direction of the manipulating element, a spring-urged pin 36 thereof will tend to slide in the direction of movement of the said manipulating element, thereby tending to urge said element to the required position.

I claim:

1. The combination with a spoked steering wheel of an automobile and a multiposition electrical switch device having an angularly movable operating handle; of means associated with the said steering wheel for actuating the switch device therefrom and comprising an intermediate friction wheel member for transferring movement from said steering wheel to the switch device in the same direction only as that imparted to the steering wheel and spaced means for driving the friction wheel member through engagement with the spokes of the steering wheel, the said friction wheel member having a resilient periphery adapted for engagement with the switch device and with the means associated with the steering wheel, when the operating handle of the switch device is displaced to one side or the other of its neutral position, for restoring said switch device to this position automatically with the repositioning of the steering wheel.

2. The combination with a spoked steering wheel of an automobile and a multiposition electrical switch device having an angularly movable operating handle; of means associated with the said steering wheel for actuating the switch device therefrom and comprising an intermediate friction wheel member and turnstile means, embodying a plurality of spaced fingers projecting therefrom into the space between adjacent spokes of said steering wheel, for driving said friction wheel member, which member is adapted for engagement with the switch device, when the operating handle of the latter is displaced to one side or the other of its neutral position, for restoring said switch device to this position automatically with the repositioning of the steering wheel.

3. The combination with a spoked steering wheel of an automobile and a multiposition electrical switch device having an angularly movable operating handle; of means associated with the said steering wheel for actuating the switch device therefrom and comprising an intermediate friction wheel member and turnstile means, embodying a plurality of spaced fingers with their outer ends axially yieldable and projecting therefrom into the space between adjacent spokes of said steering wheel, for driving said friction wheel member, which member is adapted for engagement with the switch device, when the operating handle of the latter is displaced to one side or the other of its neutral position, for restoring said switch device to this position automatically with the repositioning of the steering wheel.

4. The combination with a spoked steering wheel of an automobile and a multiposition electrical switch device having an oscillatable sleeve portion and an angularly movable operating handle attached thereto, said sleeve being provided also with a recessed arcuate peripheral portion, and the body of the switch being provided with a plurality of positioning sockets, a spring-urged plunger element carried by the operating handle adapted for engagement in the said sockets in accordance with the movement of the operating handle, the walls of the respective sockets being pitched in the direction of movement of the operating handle for contacting positions and for return to a neutral position such as to assist in the location of the operating handle plunger therein; of means associated with the said steering wheel for actuating the switch device therefrom and comprising a friction wheel member and spaced means for driving the friction wheel member through engagement with the spokes of the steering wheel, the said friction wheel member being adapted for engagement with the switch device, when the operating handle of the latter is displaced to one side or the other of its neutral position, for restoring said switch device to this position automatically with the repositioning of the steering wheel.

5. The combination with the steering wheel of an automobile; of a multiposition electrical switch device having an angularly movable operating handle disposed for oscillation in a plane substantially parallel to the plane of the steering wheel, and a bracket securing the switch device in proximity to the steering wheel and immediately beneath the rim thereof and with the axis of oscillation of the said operating handle passing through the rim, whereby the handle may be manipulated from the steering wheel by the fingers of an operator's hand and without removing the hand from said wheel.

6. The combination with a steering wheel of an automobile and a multiposition electrical switch device having an angularly movable operating handle located in proximity to the rim of said steering wheel; of means associated with the said steering wheel for actuating the switch device therefrom and comprising an intermediate friction wheel member for transferring movement from said steering wheel to the switch device in the same direction only as that imparted to the steering wheel and means for driving said friction wheel member from the steering wheel, the said friction wheel member having a resilient periphery adapted for engagement with the switch device and with the means associated with the steering wheel, when the operating handle of the switch device is displaced to one side or the other of its neutral position in the desired steering direction, for restoring said switch device to this position automatically with the repositioning of the steering wheel.

EDWARD T. CONDON.